March 18, 1952   G. KUIPERS   2,589,824
STEREOPLOTTING METHOD AND APPARATUS

Filed May 24, 1948   3 Sheets-Sheet 1

Inventor
Gerard Kuipers
By *Oswald H. Milmore*
his Attorney

March 18, 1952  G. KUIPERS  2,589,824
STEREOPLOTTING METHOD AND APPARATUS

Filed May 24, 1948  3 Sheets-Sheet 2

Inventor: Gerard Kuipers
By Oswald W. Milmore
His Attorney

March 18, 1952 G. KUIPERS 2,589,824
STEREOPLOTTING METHOD AND APPARATUS
Filed May 24, 1948 3 Sheets-Sheet 3

INVENTOR:
GERARD KUIPERS
BY: *Oswald H. Milmoe*
HIS ATTORNEY

Patented Mar. 18, 1952

2,589,824

UNITED STATES PATENT OFFICE 2,589,824

STEREOPLOTTING METHOD AND APPARATUS

Gerard Kuipers, The Hague, Netherlands, assignor to Shell Development Company, San Francisco, Calif., a corporation of Delaware Application May 24, 1948, Serial No. 28,927
In the Netherlands May 23, 1947

16 Claims. (Cl. 33—20)

(Granted under the provisions of sec. 14, act of March 2, 1927; 357 O. G. 5)

This invention relates to topography and, more particularly, to a method and apparatus for producing maps from aerial photographs which were taken with a photographic camera either in vertical or oblique direction.

It is conventional practice to photograph the territory to be mapped from an aeroplane, the photographs being preferably taken at known elevations, and in a prescribed course, the successive photographs including a common area on the ground, also termed the overlap. This overlap varies with different mapping operations and may, for example, vary from 40% to 70% overlap. That is to say, from 40% to 70% of the ground area of each photograph is included on an adjoining photograph. For making mosaics showing topographic features it is, of course, necessary that all portions of the ground to be mapped be included in overlaps.

Photographs of this type represent pictures, in central projection, of the ground. Two overlapping photographs may be considered as pictures, in central projection, of identical parts of the ground taken from different points. They can be combined to form a pair of stereophotographs which, when viewed with the aid of a stereoscope, may give an optical space model of the area in question.

By "stereoplotting" is to be understod surveying of this optical model in such a manner that the ground is reproduced in parallel projection on the map, and contour lines and other data concerning differences in elevation and ground slopes are indicated.

In principle, the generally applied method of stereoplotting is as follows: By optical projection of two adjoining pictures, a stereomodel is produced in such a way that a measuring mark or index can be brought to coincidence with the space model. The measuring mark is on a movable tracer carrying a pen or pencil, for drawing a line as the tracer is moved about, the space model being made visible by viewing through a suitable stereoscope.

Known stereoplotting devices according to a common type are designed to provide a pair or several pairs of projectors for projecting pictures in complementary colors downward onto a table. The projectors have frames for holding transparent pictures, e. g., diapositives, a source illumination above each transparency, and a focusing lens beneath it. The optical dimensions are usually designed in such a manner that, taking into consideration a given lens distortion, the cone of projecting rays from each transparency form angles which are geometrically similar to the rays of the original photographic exposure during aerial photography. If, therefore, these optical plotters are correctly oriented with regard to each other, two cones of rays are formed, of which the corresponding rays (i. e., rays relating to the same detail of the landscape photographed) intersect in an optical space model, which is a three-dimensional reproduction of the landscape photographed. Although this space model does not really exist, it may be observed stereoscopically through so-called anaglyphic glasses.

The shape of such optical space model can be determined and plotted by providing a tracing device having a small, vertically adjustable measuring-plane table carrying an index mark, sometimes in the form of a luminous point, in the center thereof. The tracing device is placed on the drawing table and has a tracing pen directly beneath the index mark. Wherever this measuring plane intersects with or touches the surface of the space model, images projected from the transparencies (e. g., the aforesaid corresponding rays) coincide. By moving the central index mark through these points of coincidence it is possible to trace a contour. Such a known so-called optical double-image projection may be looked upon as a stereoscopic-model projection from two photographic images onto a measuring mark plane. Such projections are inconvenient, require the use of several colors, and involve some complications in the mounting and support of the stereoscope, particularly when magnification is desired for accuracy.

It is also known to project rays from index marks through the transparencies and adjust the rays therefrom to bring them into coincidence; this, too, is inconvenient and presents difficulties.

Finally, it is also known to view opaque pictures through a stereoscope and trace contours by bringing wires or hair lines into coincidence.

It is an object of the present invention to provide an improved method and device for stereoplotting wherein the index mark is projected from a point in space onto several translucencies which are specially prepared to function as projection screens, and which are viewed by means of a suitable stereoscope.

A further object is to provide an improved translucency suitable for stereoplotting according to the instant invention.

Still another object is to provide an improved method and apparatus for stereoplotting which is convenient to use; wherein the stereoscope can be located on the side of the translucency away from the drawing board; and wherein the space relationships are reproduced in a simple manner.

Another object is to provide an improved stereoplotting method and device wherein the slopes of ground forms or other objects on the ground can be readily measured.

Still further objects will become apparent from the following description, taken in connection with the drawings forming a part of this specification, wherein.

Figure 4:
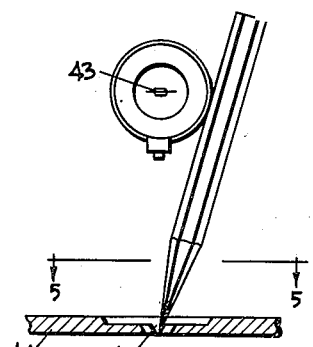
Figure 3:
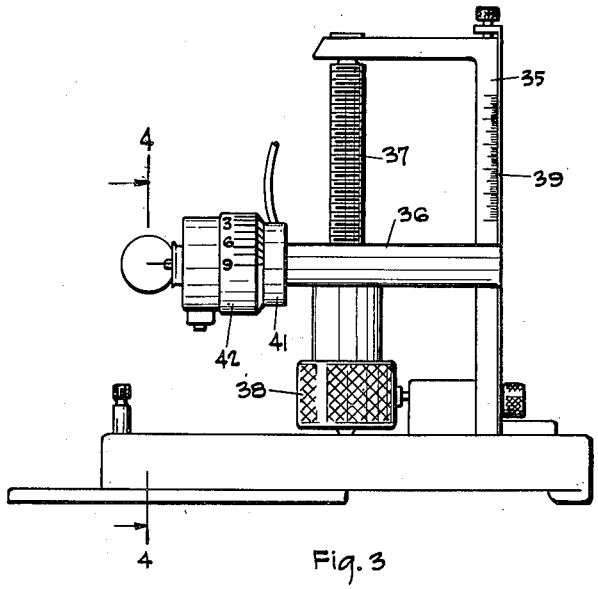
Figure 3 is a front elevation of a slope measuring device.
Figure 5:
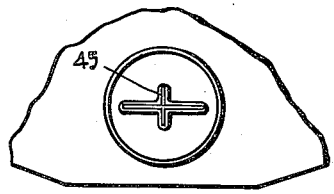
Figure 6:
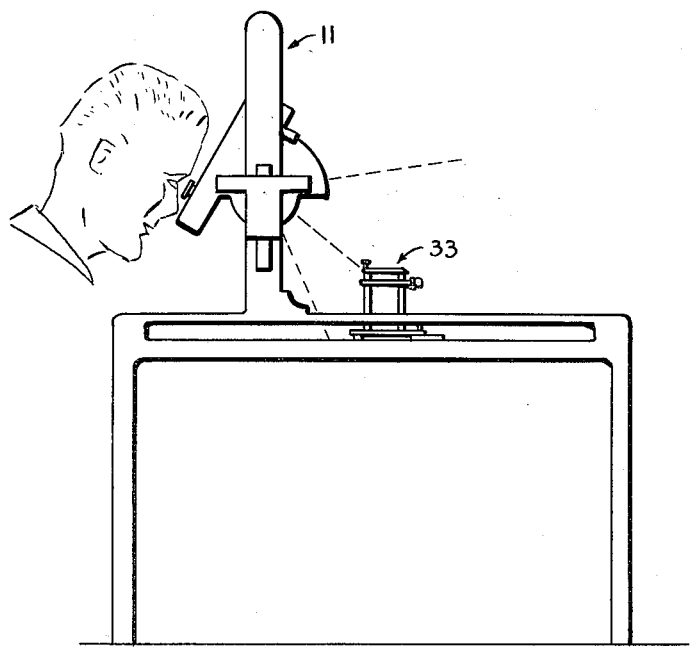
Figure 7:
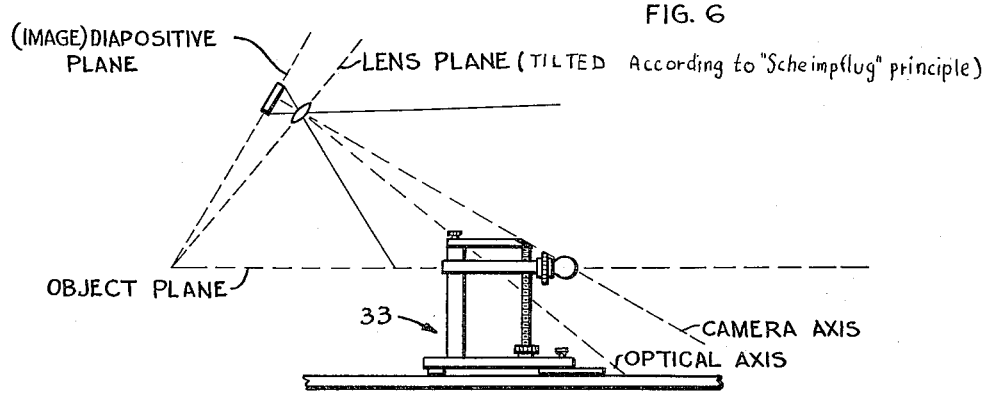

Figures 4 and 5 are sectional views taken on lines 4—4 and 5—5, respectively, of Figure 3;

Figure 6 is a side elevation view showing the use of the apparatus for plotting from oblique photographs; and Figure 7 is a schematic diagram illustrating the optical system according to Figure 6.

Briefly, according to the present invention, I provide a pair of translucencies of photographs forming a stereo pair, said translucencies having a screen surface, e. g., a coating on one exterior surface, or an intermediate surface or lamination, adapted to act as a projection screen, whereby light projected against one side of the translucency will be visible on the other side thereof as a well defined image. These translucencies may, if desired, be reduced in size and/or rectified from the original photographs by well known methods. They are positioned, for example in suitable holders, in spaced and oriented relationship as previously described for the known double-image projection system some distance from a drawing table, and projecting lenses are interposed between the translucencies and the table. However, instead of projecting the images toward the table, the translucencies are viewed directly, preferably by means of a stereoscope, from their sides away from the table, being suitably illuminated either by transmitted light passing from the direction of the table, or by reflected light falling from the direction of the stereoscope. A tracing device carrying a tracing pen, movable on the drawing table, is provided with a luminous source which is projected onto the screen through the projection lenses. The image of the luminous source on the screen will be observed to lie at a definite elevation with respect to the ground features, i. e., above the ground, on it, or below it; its apparent elevation can be altered by altering the distance of the luminous source from the translucency. By moving the tracing device about the table while maintaining the image at the apparent ground elevation a contour is drawn on the table.

While I prefer to use diapositives for the translucencies, it should be understood that the invention is not restricted thereto and that it is, in certain cases, possible to employ negative transparencies or translucencies. I employ the term "translucencies" herein to denote any photographic reproduction on photographic film, glass, etc., including transparencies, in which the picture can be seen from at least one side while, simultaneously, on the same side there is visible an image of light projected onto the other side. A preferred method of preparing the translucency is to apply a coating of extremely thin white paint to the emulsion side of a diapositive. However, the screen surface may also be applied by chemical precipitation of opaque material or pigment, etc.

A particular advantage of my improved method and arrangement is the facility of viewing the device, this being effected without the necessity of projecting the pictures against the drawing table or measuring plane table or of employing lights of different colors. However, it is apparent that it is possible to illuminate the two translucencies with different colored lights.

The invention may be applied for viewing vertical or oblique photographs. In either case, the translucencies are mounted in positions corresponding to those in which the original photographic films were exposed (modified somewhat in the case of rectified translucencies) and the optical axes of the holder and lens are similarly made to correspond to the optical axes of the photographic cameras. For example, in the case of vertical photographs, the translucencies are mounted horizontally, and the optical axes are vertical; in the case of obliques, they are inclined.

Figure 1:
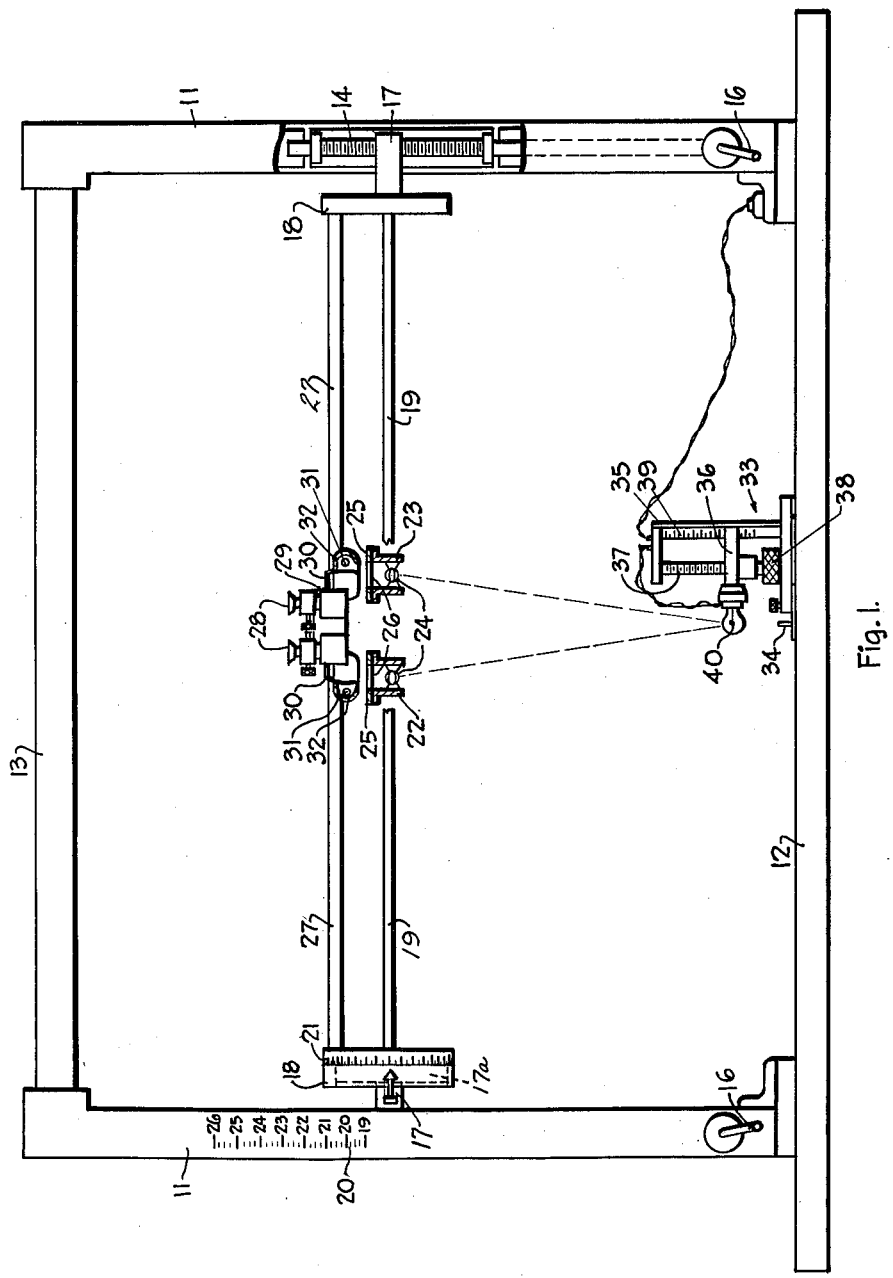
Figure 1 is a front elevation of an apparatus embodying the invention.
Figure 2:
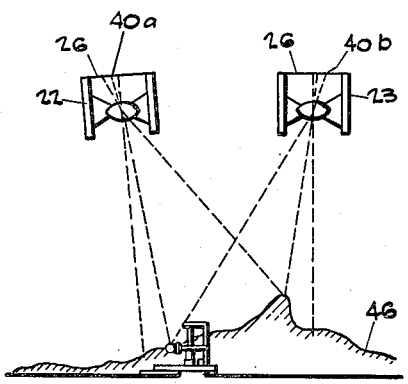
Figure 2 is a schematic diagram illustrating the principle of the invention.

Referring to the drawings, and particularly to Figs. 1 and 2, there is shown a combined plotter and stereoscope mounted in a frame having uprights 11 and adapted to rest on a drawing table 12 which may be covered with suitable drafting paper. The uprights are cellular and interconnected at the top by a tubular member 13. Within each upright is a vertical screw 14, journalled in transverse webs, and provided with bevel gears so as to be rotatable by a crank 16. Each screw 14 carries an internally threaded nut 17 which extends through a slot in the side of the upright and supports a circular disc 17a acting as a journal for a drum 18. The two drums 18 are interconnected by a horizontal beam 19. It is evident that the drums 18 and the beam 19 form one unit and may be rotated about a horizontal axis to tilt the device, while this unit, together with the nuts 17, may be raised or lowered by means of the cranks 16. Height scales 20 may be provided on the uprights, while the angular position of the drums 18 may be read on a scale 21, graduated in degrees.

The beam 19 carries a plurality, e. g., two holders 22 and 23 for the translucencies. These holders are preferably mounted to permit independent adjustment in various directions (ΔX, ΔY and ΔZ) as well as to permit the axis to be inclined in any desired direction. Such adjustable supports being well known per se, it is thought to be unnecessary to illustrate them in detail. Each holder is provided with a lens 24, preferably a wide-angle lens which may be provided with a diaphragm, not shown. A removable frame 25 for the transparency is secured to the top of the holder, at a distance causing light emitted from the luminous source of the tracer (to be described) to be focused on the translucency 26. In the specific embodiment described herein, the translucency is a diapositive having a coating of very thin white paint on its emulsion side, which is mounted downwardly, toward the lens 24, and parallel to the lens plane. The apparatus in Figures 1 and 2 is adjusted for plotting from vertical photographs, and the translucency and lens are substantially parallel to the table 12; however, as shown, they are not exactly parallel because allowance must be made for deviation from vertical of the camera axis at the time of making the original photograph. The translucencies are properly oriented (i. e., adjusted as to direction, position, and inclination) by well known methods, e. g., by bringing three or four control points into coincidence.

A stereoscope is movably mounted above the holders by means of a transverse bar 27 supported at its ends in the drums 18. The stereoscope has a conventional optical system comprising eye pieces 28, reflecting prisms within housings 29, reflecting mirrors 30, and magnifying lenses (not shown). The stereoscope may be moved along the bar 27 to bring the mirrors 30 above any pair of holders that may be mounted on the bar 19, and the horizontal distance between the mirrors 30 may be adjusted to conform to the interval between the centers of the translucencies to be observed. I prefer to provide illumination for the translucencies from above, such as small electric lamps 31 fitted with reflectors 32, supported by the stereoscope.

The tracing device 33 comprises a small, movable stand carrying a pen or equivalent drawing instrument 34 and having an upright 35 forming a guide for vertically slidable slide member 36. A screw 37 is journalled at its ends and is threaded to the slide 36, whereby rotation of the screw by means of a knurled knob 38 permits vertical adjustment of the slide. An elevation scale 39 is provided on the upright. The slide carries a small electric lamp having a small filament 40, positioned directly above the point of the pen 34.

The principle of operation is illustrated in Fig. 2. The measuring mark is formed by the filament 40 of the burning electric lamp. A reduced image of the filament is projected against each translucency through the lenses 24. These images are indicated at 40a and 40b, and appear as well defined images on the screen of the translucency, e. g., on the semi-transparent coating on the emulsion side of a diapositive. In Figure 2, 46 represents the space model, such as would be formed if the pictures were projected downwardly according to the known methods. If the measuring mark 40 coincides with the surface of the ground model, the images 40a and 40b will appear in identical points of the translucencies. Whether this is the case may be readily ascertained by observation, e. g., by means of the stereoscope, which makes it possible to gain a spatial view of both the ground and the measuring mark. If the mark 40 is on the surface of the space model, the illuminated point is thus seen in the stereoscope to coincide with a point of the ground. One may record the contours on the space model by moving the tracing device 33 along a path such as to keep the measuring mark 40 coincident with the surface of the space model; such movement causes a simultaneous movement of the pen 34, thereby producing a topographic map in parallel projection of the landscape photographed.

By turning the knurled knob 38 the filament 40 may be raised or lowered through a distance indicated by the scale 39. The tracer is then set to trace another contour, representing a different elevation of the ground.

The measuring mark lamp has a centered filament body of very small dimensions and is preferably energized at an electric potential greater than its rating, to produce a bright luminous source. The small luminous spot thus formed on the translucency is intercepted by the semi-transparent coating or screen, which is sufficiently transparent to allow a part of the light to radiate on the smooth or glass side of the translucency. The translucency may be viewed by transmitted or reflected light, such as daylight. However, from experiments carried out it was found that the relation of light intensity between the stereoimage and the measuring mark was very important to facilitate accurate depth perception. In order to obtain illumination of the translucency which would be independent of fluctuations in daylight the small lamps 31 were provided. By providing a suitable rheostat (not shown) for adjusting the intensity of these lamps, it is possible to maintain the most favorable intensity relation between the measuring mark and the stereoimage, and such an arrangement is most advantageous.

It was found, moreover, that some care must be taken in preparing the translucencies to provide a semi-transparent screen. According to one simple embodiment, diapositives are used and the coating applied on the emulsion side consists of an extremely thin layer of white ink (containing white lead) applied in the following manner: Put a closed series of diapositives with moistened emulsion on a level table top with the glass or glossy side down and apply quickly with a soft paint brush a thin solution of the white ink. Let them dry slowly in a dust-free place. When observing these diapositives with reflected light from the glass side, this coating serves as a white background on which the picture appears clearly and makes the same impression as a paper print with normal contrast. Too much density or opaque shades are to be avoided. In order to obtain such a satisfactory result proper exposing and developing are of great importance. The problem of determining the correct exposure and developing resolves itself into judging the density of the diapositives when they are lying on the bottom of a white enamel developing or washing tray.

Moreover, the white coating serves also as a surface on which the reduced image of the lamp filament, as a measuring mark, is projected. The brightness of this illuminated spot is of such intensity that this measuring mark is clearly visible as a real light point, even from the glass side of the diapositives. In case the pictures are taken with less than about 65% overlap in the line of flight the falling-off in marginal illumination may cause some difference in intensity between the measuring marks of the left and right stereo-images. This problem can be solved effectively by increasing the density of the white coating near the center of the plate. The following method has been put into practice with good results: Touch the surface of the wet diapositives, which have just been coated, with the point of a well saturated coating brush to effect the required change in density.

In special cases, for example with map plotting for geological purposes, it is desirable to measure the ground slope directly, instead of computing it from the contours. This is made possible according to the invention by providing a slope measuring device shown in Figures 3, 4, and 5, wherein reference numbers 25 to 39 designate parts corresponding to those described for Figure 1. The slide 36 carries a ring 41 to which a collar 42 is rotatably attached, there being graduations on the collar to indicate the angular position. The collar carries a lamp socket in which is mounted an electric lamp having an elongated filament 43 in the shape of a straight line perpendicular to the axis of the rotation of the collar and socket. Instead of a pen, this device carries a ruler 44 with a cut-out portion or slot of any geometrical design, e. g., in the form of a cross 45, to locate a point directly beneath the center of the filament, one line of the cross being parallel to the aforesaid axis of rotation, and the other perpendicular to it. By rotating the collar 42 it is possible to incline the straight, elongated filament 43 at any desired angle. By this adjustment, and by proper orientation of the stand, the filament can be brought to lie tangent to the surface of the space model. The direction of the slope can be marked on the paper by drawing lines along the slot of the ruler, and the angle of inclination or dip slope can be read on the graduated scale on the collar 42. Thus it is possible to determine slopes by direct measurement in the undistorted space model of ground forms of which vertical or oblique photographs have been taken.

The method and apparatus can also be applied to oblique photographs. For this the drums 18 are rotated to position the optical axis as shown in Figure 6, thereby simultaneously moving the holders and stereoscope. The proper degree of inclination is indicated in Figure 7 that is, the lens plane of the stereoscopic viewing apparatus is tilted according to the Scheimpflug principle. This principle is well known to those skilled in the art of photogrammetry and is described in detail in the "Manual of Photogrammetry," Pitman Publishing Corporation, New York, 1944, pp. 58 and 59. Plotting is then carried out in the same manner as was described above.

I claim:

1. A method of plotting from stereophotographs comprising the steps of placing a pair of translucencies of said photographs in projectors in oriented relationship above a drawing table, said translucencies having screen surfaces adapted to permit an image projected onto one side thereof to be seen from the opposite side simultaneously with the picture in said translucency, projecting the image of a measuring mark from a common luminous source against one side of said translucencies, viewing the translucencies stereoscopically from said opposite sides to determine the relative elevations of said image of the measuring mark and the space model of the objects pictured in said translucencies and moving said measuring mark in a plane parallel to said drawing table while stereoscopically viewing the translucencies.

2. The method according to claim 1 wherein the translucencies are illuminated by reflected light directed against the said opposite sides thereof.

3. A method of plotting from stereophotographs comprising the steps of placing a pair of translucencies of said photographs in projectors in oriented relationship, said translucencies having screen surfaces adapted to permit an image projected onto one side thereof to be seen from the opposite side simultaneously with the picture in said translucency, projecting the image of a measuring mark from a common luminous source against one side of said translucencies, viewing the translucencies stereoscopically from said opposite sides to determine the relative apparent elevations of said image of the measuring mark and the space model of the objects pictured in said translucencies, moving said luminous source about at a fixed distance from the predetermined plane along a path such as to keep the image of the measuring mark coincident with the surface of said space model, and recording the said path by means of a drawing instrument.

4. The method according to claim 3 wherein the stereophotographs are vertical photographs, and said translucencies are mounted substantially parallel to said predetermined plane.

5. The method according to claim 3 wherein the stereophotographs are oblique photographs and said translucencies are mounted at an angle with respect to said predetermined plane corresponding approximately to the obliquity at which the photographs were taken.

6. A method of plotting and determining slopes from stereophotographs comprising the steps of placing a pair of translucencies of said photographs in projectors in oriented relationship, said translucencies having screen surfaces adapted to permit an image projected onto one side thereof to be seen from the opposite side simultaneously with the picture in said translucency, projecting the image of an elongated measuring mark from a common luminous source against one side of said translucencies, the inclination of said elongated luminous mark being adjustable, viewing the translucencies stereoscopically from said opposite sides to determine the relative apparent slopes of said image of the measuring mark and the space model of the objects pictured in said translucencies, changing the inclination of said luminous measuring mark until said slopes are the same, and measuring the inclination of said luminous measuring mark.

7. The method according to claim 6 wherein the orientation of said elongated measuring mark is adjusted to position said mark in the direction of greatest slope of the space model of the objects pictured in said translucencies, and said direction is recorded by drawing a line in a direction corresponding to the position of the measuring mark.

8. A method of plotting from stereophotographs comprising the steps of placing a pair of diapositives of said photographs in projectors in oriented relationship and substantially parallel to a drawing table, said diapositives having a semi-transparent coating of light-colored pigment on the emulsion side to permit an image projected against said coated side to be seen from the glass side simultaneously with the picture in said diapositive, projecting the image of a measuring mark from a common luminous source against said coated side, viewing the diapositives stereoscopically from the glass sides to determine the relative elevations of said image of the measuring mark and the space model of the objects pictured in said diapositives and moving said measuring mark in a plane substantially parallel to said diapositives and said drawing table along a contour of the space model while stereoscopically viewing the projected image of said mark on the diapositives.

9. Apparatus for plotting from stereophotographs comprising a pair of holders for translucencies of said photographs, a drawing table, a frame supporting said holders spaced from said drawing table, translucencies of said photographs in said holders, said translucencies having screen surfaces adapted to permit images projected onto their sides toward said drawing table to be seen on the opposite sides simultaneously with the pictures in said translucencies, projecting lenses interposed between said translucencies and said drawing table, a single luminous measuring mark movably mounted for motion in a predetermined plane parallel to said drawing board and disposed between said drawing table and the lenses, said projecting lenses being located to project an image of said luminous mark on each of said translucencies, and a stereoscope disposed for viewing the translucencies from their sides away from the drawing table.

10. The apparatus according to claim 9 wherein the translucencies are diapositives having a semi-transparent coating of light-colored pigment on the emulsion side, and said coated side is faced toward the luminous measuring mark.

11. In combination with the apparatus according to claim 9, electric lamps positioned to illuminate said translucencies by reflected light on the sides away from the drawing table.

12. The apparatus according to claim 9 wherein the said luminous mark comprises a small electric lamp mounted on a carriage, said carriage being supported by said drawing table and movable thereon and having a drawing instrument for tracing a contour on said table when moved about thereon.

13. The apparatus according to claim 9 wherein the said luminous mark comprises a small electric lamp mounted on a carriage for rotation about a horizontal axis, said lamp having an elongated filament substantially perpendicular to said axis of rotation, and a scale mounted on said carriage for indicating the inclination of said filament.

14. The apparatus according to claim 13 wherein the said lamp is vertically adjustable on said carriage.

15. A slope measuring device for use with stereoplotting apparatus of the type in which a luminous measuring mark is projected against a pair of translucencies forming a stereo-pair having a screen, comprising a carriage adapted to be supported on a drawing table, a lamp mounted on said carriage for rotation about a horizontal axis, said lamp having a filament in the form of a straight line substantially perpendicular to said axis of rotation, and a scale for indicating the inclination of said filament.

16. The slope measuring device according to claim 15 wherein the lamp is vertically adjustable in the carriage, and the carriage is provided with a drawing guide in alignment with said filament, whereby the direction of said filament may be recorded on said drawing table.

GERARD KUIPERS.

REFERENCES CITED

The following references are of record in the file of this patent:

UNITED STATES PATENTS

| Number | Name | Date |
|---|---|---|
| 1,875,363 | Aldis | Sept. 6, 1932 |
| 1,925,207 | Santoni | Sept. 5, 1933 |
| 2,085,498 | Horner | June 29, 1937 |
| 2,363,643 | Cook | Nov. 28, 1944 |

FOREIGN PATENTS

| Number | Country | Date |
|---|---|---|
| 581,642 | France | Oct. 1, 1924 |